Aug. 28, 1951     P. S. PINKNEY     2,566,244
ETHYLENE/VINYL ALCOHOL/ACRYLIC ACID COPOLYMERS, THEIR
AMMONIUM SALTS AND PAPER COATED THEREWITH
Filed Nov. 10, 1949
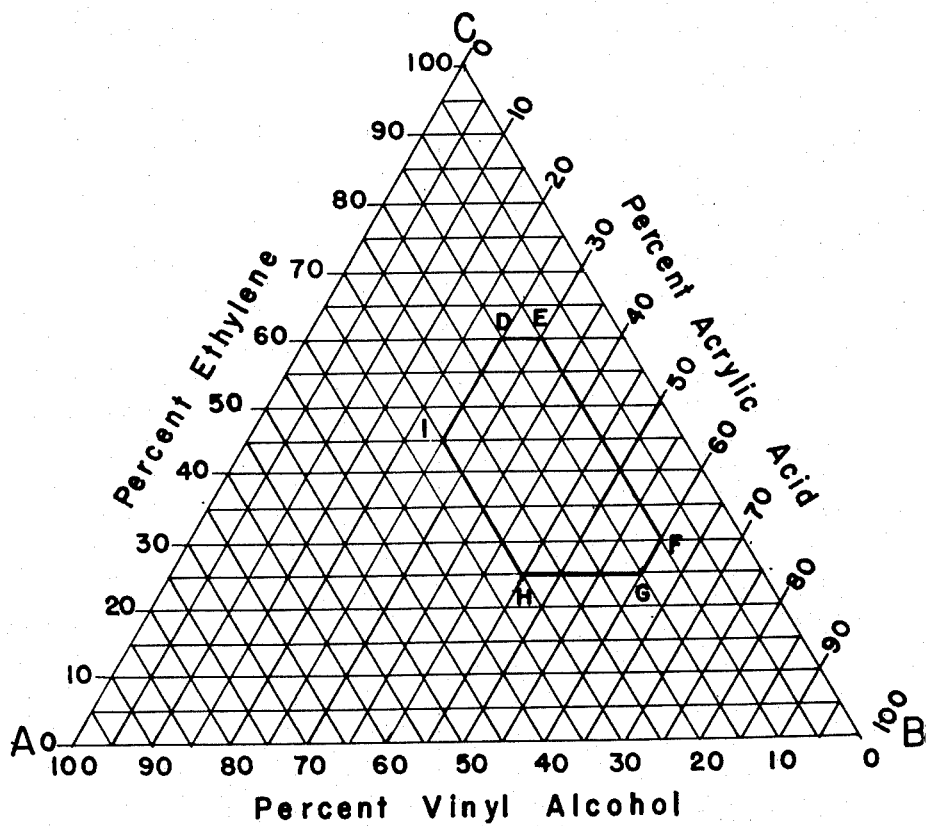
INVENTOR
Paul Swithin Pinkney
BY Frederick Schafer
ATTORNEY Patented Aug. 28, 1951

2,566,244

UNITED STATES PATENT OFFICE 2,566,244

ETHYLENE/VINYL ALCOHOL/ACRYLIC ACID COPOLYMERS, THEIR AMMONIUM SALTS, AND PAPER COATED THEREWITH

Paul S. Pinkney, Niagara Falls, N. Y., assignor to E. I. du Pont de Nemours & Company, Wilmington, Del., a corporation of Delaware Application November 10, 1949, Serial No. 126,670

4 Claims. (Cl. 117—155)

This invention relates to new compositions of matter and more particularly to polymeric materials.

The availability of ethylene has stimulated the preparation and characterization of ethylene copolymers. The presence of ethylene in copolymers generally reduces the ease of solution of the polymers in various solvents. In general, this is an advantage. For uses which require relatively high concentrations of high molecular weight polymers in solution, such as solutions of film-forming materials, this reduction in solubility is undesirable. For example, aqueous solutions of polymeric materials are useful in the coating of paper, particularly as binders for coating pigments. Casein, for example, has found application in this use, and where water resistance in coated paper is desired, the casein is treated with formaldehyde. Casein, however, is not entirely satisfactory for this use, particularly since the calendering properties and stability toward microorganisms are capable of improvement. Furthermore, formaldehyde-treated casein causes difficulty in reworking waste paper.

This invention has as an object a new and useful polymeric material. A further object is a synthetic polymer which is soluble in aqueous solutions, and which is of valuable application in the paper industry, and which for this purpose is free from the defects noted in connection with the polymers mentioned above.

The new polymeric materials of this invention are high molecular weight ethylene/vinyl alcohol/acrylic acid copolymers which have a percentage composition of 25% to 60% ethylene, 10% to 30% vinyl alcohol, and 25% to 60% acrylic acid.

The single figure in the drawing is a three component graph in which the composition of the copolymers of this invention are represented within the field of all possible copolymers obtainable from the reactants used in preparing the copolymers defined herein.

In this figure the side AC of the graph represents from 0% to 100% by weight of ethylene, the side CB from 0% to 100% by weight of acrylic acid, and the side BA from 0% to 100% by weight of vinyl alcohol. The area bounded by the lines DEFGHI represents the compositions of the polymers of this invention.

The ethylene/vinyl ester/alkyl acrylate copolymers which by subsequent hydrolysis yield the ethylene/vinyl alcohol/acrylic acid copolymers of this invention are readily obtained, e. g., by the polymerization of ethylene at 250–1500 atmospheres pressure or even higher pressures, e. g., of up to 3000 atmospheres, in the presence of vinyl acetate and ethyl acrylate, the latter two of which are present in approximately equal amounts.

A small amount of catalyst, generally 0.05 to 3.0% by weight based on the liquid polymerizable monomers present, such as benzoyl peroxide or alpha,alpha'-azodiisobutyronitrile, is used as the polymerization initiator and a nonreactive solvent such as benzene or tert.-butyl alcohol is preferably present in amount generally equivalent to or greater than the amount of liquid polymerizable monomers. The polymerization temperature is generally 60–120° C. for times of 10–20 hours although the exact times and temperatures may be varied depending upon the activity of the specific catalyst used and properties desired in the resulting polymer. A continuous process for the polymerization may be employed. Solvent and unreacted monomers are removed from the polymer, e. g., by steaming. The polymer is dried suitably by the use of a rubber mill heated to 125–150° C.

The hydrolyzed polymer, i. e., the ethylene/vinyl alcohol/acrylic acid copolymer of the ratios herebefore stated is readily obtained by treatment of a solution of the polymer with a suitable hydrolyzing agent or catalyst such as an alkali. In general the polymer is readily dissolved in hot dioxan or dioxan-benzene mixtures. The hydrolyzing agent is preferably potassium hydroxide dissolved in an alcohol such as methanol. The amount of alkali employed is generally in excess of that calculated to react completely with the saponifiable groups. The hydrolysis is preferably effected by heating the alkali and polymeric material to the boiling point with the addition of water to replace the solvent lost by boiling. Times of about 2 hours result in the substantially complete hydrolysis of the polymer. The hydrolyzed polymer is readily obtained by acidifying with a mineral acid an aqueous solution of the alkali salt of the polymer, e. g., by treatment with hydrochloric acid. The hydrolyzed polymer is thereby precipitated and is purified by washing with water and dried.

The following example, in which the parts are by weight unless otherwise specified further illustrates the preparation of these materials.

EXAMPLE

A. Preparation of ethylene/vinyl acetate/ethyl acrylate copolymer

Into a stainless-steel pressure-resistant vessel having a capacity of 1200 parts of water was placed 100 parts of vinyl acetate, 100 parts of ethyl acrylate, 300 parts of benzene, and 0.1 part of alpha,alpha'-azodiisobutyronitrile. The air was removed by flushing with nitrogen and the nitrogen evacuated. Ethylene was added at a pressure of 600–650 atmospheres. The polymerization was effected by heating the reactants at 70° C. for 15 hours during which the pressure was maintained at 880–1000 atmospheres by occasional repressuring with ethylene. The reactor was cooled, excess ethylene was released, and the polymer was steamed to remove benzene and unreacted monomers. It was dried on a rubber mill at 145° C. There was obtained 98 parts of copolymer which had an inherent viscosity of 1.177 as determined in xylene at 85° C. at a concentration of 0.125 g./100 ml. of solution.

B. *Hydrolysis of ethylene/vinyl acetate/ethyl acrylate copolymer*

A total of 40 parts of the above copolymer was dissolved in about 500 parts of boiling dioxan and to this was added a methanol solution containing 25 parts of potassium hydroxide. The mixture was boiled for about two hours during which time the solvents which were evaporated were replaced by water. The mixture was poured into water and acidfied with excess hydrochloric acid to pH of about 2.5. The precipitate was collected on a filter and washed with water until the wash water was free from chloride ions. The product was dried at 60–70° C. The hydrolyzed product had a weight ratio of ethylene/vinyl alcohol/acrylic acid of 32/14/54 as based on the analysis of the copolymers (both initial and hydrolyzed) and acid number of the hydrolyzed polymer which was assumed to be substantially completely hydrolyzed. The analysis of the hydrolyzed copolymer was: percent C, 62.05; percent H, 8.65; Acid No. 425.4. The inherent viscosity of the unhydrolyzed polymer was 1.61, as determined by dividing the natural logarithm of the relative viscosity in xylene at 85° C. by the concentration which was 0.125 mg./100 ml. of solution.

The following table gives the composition by weight of the ethylene/vinyl alcohol/acrylic acid (designated as E/VA/A) copolymers, their tensile strength in lb./sq. in., percent elongation, bending modulus in lb./sq. in., and the inherent viscosity of the unhydrolyzed precursor of copolymers prepared by the general procedure of the above example. The first polymer listed is that of the example.

Table

| No. | E/VA/A Ratio | Tensile Strength | Per Cent Elongation | Bending Modulus | Inherent Viscosity |
|---|---|---|---|---|---|
| 1 | 32/14/54 | 5400 | 300 | 8,300 | 1.61 |
| 2 | 36/18/46 | 5170 | 150 | 100,000 | .88 |
| 3 | 39/28/33 | 6310 | 70 | 200,000 | .92 |
| 4 | 41/20/39 | 5610 | 260 | 31,000 | .72 |
| 5 | 50/20/30 | 4640 | 250 | 37,000 | 1.02 |
| 6 | 50/19/31 | 4160 | 280 | 4,250 | .97 |
| 7 | 56/16/28 | 4890 | 320 | 4,900 | 1.06 |

The hydrolyzed products prepared by the foregoing procedure were effective in ammonia solution as pigment binders in the coating of paper when they were obtained from initial copolymers which had inherent viscosities of at least 0.7. The products of the present invention, which as previously indicated, are represented by the area DEFGHI in the graph, are particularly valuable as binders for clay in the coating of paper. The preferred products have a molecular weight of at least 50,000. The maximum molecular weight is not critical but generally is not more than 250,000.

These hydrolyzed products are most useful as pigment binders in paper coatings in the form of the ammonium salts. The coatings are insoluble after drying under normal conditions, but unlike casein, they are soluble in alkali and do not interfere in the repulping of paper. Furthermore, the pigment binding power of the hydrolyzed copolymers of this invention is superior to that of casein, e. g., 4 parts of the polymer corresponded in binding power to 9 parts of casein. The resultant coatings were satisfactory as regards water resistance, flexibility, calendering, and printing properties, and were stable to microorganisms.

As many apparently widely different embodiments of this invention may be made without departing from the spirit and scope thereof, it is to be understood that this invention is not limited to the specific embodiments thereof except as defined in the appended claims.

I claim:

1. An ethylene/vinyl alcohol/acrylic acid copolymer which has a molecular weight of at least 50,000, and contains by weight in combined form from 25% to 60% ethylene, from 10% to 30% vinyl alcohol, and from 25% to 60% acrylic acid.

2. Paper containing a coating comprising a pigment binder consisting of the ammonium salt of an ethylene/vinyl alcohol/acrylic acid copolymer which has a molecular weight of at least 50,000, and contains by weight in combined form from 25% to 60% ethylene, from 10% to 30% vinyl alcohol, and from 25% to 60% acrylic acid.

3. Paper containing a coating comprising clay and as a binder therefor the ammonium salt of an ethylene/vinyl alcohol/acrylic acid copolymer which has a molecular weight of at least 50,000, and contains by weight in combined form from 25% to 60% ethylene, from 10% to 30% vinyl alcohol, and from 25% to 60% acrylic acid.

4. A polymeric material selected from the class consisting of an ethylene/vinyl alcohol/acrylic acid copolymer and the ammonium salt thereof, said ethylene/vinyl alcohol/acrylic acid copolymer having a molecular weight of at least 50,000 and containing by weight in combined form from 25% to 60% ethylene, from 10% to 30% vinyl alcohol, and from 25% to 60% acrylic acid.

PAUL S. PINKNEY.

REFERENCES CITED

The following references are of record in the file of this patent:

UNITED STATES PATENTS

| Number | Name | Date |
|---|---|---|
| 2,396,785 | Hanford | Mar. 19, 1946 |
| 2,436,256 | Hanford | Feb. 17, 1948 |
| 2,480,551 | Coffman et al. | Aug. 30, 1949 |